United States

Ikeda

[11] 4,110,007
[45] Aug. 29, 1978

[54] LARGE APERTURE PHOTOGRAPHIC LENS SYSTEM

[75] Inventor: Yoshitsugi Ikeda, Hachiouji, Japan

[73] Assignee: Olympus Optical Co., Ltd., Japan

[21] Appl. No.: 660,119

[22] Filed: Feb. 23, 1976

[30] Foreign Application Priority Data
Feb. 25, 1975 [JP] Japan .................. 50/23204

[51] Int. Cl.² .................. G02B 9/62
[52] U.S. Cl. .................. 350/215
[58] Field of Search .................. 350/215

[56] References Cited
U.S. PATENT DOCUMENTS
3,938,884  2/1976  Nakagawa .................. 350/215

Primary Examiner—Conrad J. Clark
Attorney, Agent, or Firm—Cushman, Darby & Cushman

[57] ABSTRACT

A large-aperture photographic lens system of variant Gauss type which has a back focal distance nearly as long as 70% of the total focal distance of the entire lens system and wherein aberrations are favorably corrected.

5 Claims, 21 Drawing Figures

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

LARGE APERTURE PHOTOGRAPHIC LENS SYSTEM

BACKGROUND OF THE INVENTION (a) Field of the Invention

The present invention relates to a photographic lens system having an angle of image approximately 43°, and aperture ratio of 1 : 1.2 and a back focal distance nearly as long as 70% o f the total focal distance of the entire lens system.

(b) Description of the prior art

In order to obtain a variant Gauss type photographic lens system having a large aperture ratio and a long back focal distance, it is generally required to appropriately modify the symmetry of the front and rear lens groups with regard to a stop while making use of the merits resulting from the symmetry.

SUMMARY OF THE INVENTION

It is, therefore, a primary object of the present invention is to provide a variant Gauss type photographic lens system having a large aperture ratio, a long back focal distance and wherein aberrations are favorably corrected.

The photographic lens system according to the present invention comprises six components of seven lenses, i.e., a first positive meniscus lens component, a second positive meniscus lens component, a third negative meniscus lens components, a fourth cemented meniscus doublet lens component, a fifth positive meniscus lens component and a sixth positive lens component, said photographic lens system satisfying the following conditions:

(1) $0.8f < r_1 < 1.05f$
(2) $0.45f < r_3 < 0.55f$
   $1.1 < \dfrac{r_5}{r_4} < 1.5$
(3) $0.9 < r_6/d_6 < 1$
   $1.03 < -\dfrac{r_7}{r_6} < 1.2$
(4) $1.2f < -r_{10} < 2.1f$
   $0.9 < r_{11}/r_9 < 1$
   $-r_{11} < 0.6f$
(5) $0.02f < d_4 < 0.075f$
   $0.15f < d_3 + d_4 + d_5 < 0.2f$
(6) $1.75 < N, N = \dfrac{n_1 + n_2 + n_5 + n_6 + n_7}{5}$ wherein the reference symbols represent as defined below:

$r_1, r_3, r_4, r_5, r_6, r_7, r_9, r_{10}$ and $r_{11}$: radii of curvature on the object side surface of the first lens component and surfaces on both sides of the second, third, fourth and fifth lens components respectively $d_3$ and $d_5$: thicknesses of the second and third lens components respectively $d_4$ and $d_6$: airspace between the second and third lens components and that between the third and fourth lens components respectively $n_1, n_2, n_5, n_6$ and $n_7$: refractive indices of the first lens component, the second lens component, the image side lens of the fourth lens component, the fifth lens component and the sixth lens component.

In a photographic lens system so designed as described above, the lens performance is largely dependent on the radii of curvature on the surfaces arranged symmetrically with regard to the stop i.e., radii of curvature $r_6$ and $r_7$ on the image side surface of the third lens component and the object side surface of the fourth lens component. That is to say, $r_6$ and $r_7$ are important factors which serve, in cooperation with the airspace $d_6$ between said lens components, to obtain an appropriate balance between various aberrations and light intensity around the circumference of the photographic lens system. As the radius of curvature $r_6$ has a higher value, effect for correcting aberrations is reduced to allow coma to be produced and, in addition, it becomes impossible to obtain sufficient light intensity. When the radius of curvature $r_6$ has too small a value, in contrast, offaxial aberrations such as coma are aggravated and, in addition, it is impossible to reserve the space required for arranging a stop means.

The condition (3) has been defined for taking the above-mentioned fact into consideration and a photographic lens system will have the above-mentioned defects when $r_6/d_6$ deviates from the range defined by the condition (3). Further, flare due to coma will be produced when $r_6/d_6$ exceeds the upper limit of the condition (3). If $r_6/d_6$ has a value below the lower limit of the condition (3), on the other hand, it becomes impossible to correct spherical aberration, astigmatism and Petzval's sum even by adopting additional correcting means.

The conditions (1) and (2) have been adopted for defining radii of curvature on the lens surfaces of the front lens group. In these conditions, the most important requirement is to select different radii of curvature $r_4$ and $r_5$ for the opposite surfaces of the second and third lens components within the range defined by the condition (2). When $r_5/r_4$ has a value below the lower limit defined by the condition (2), difference in radius of curvature is minimized between both the surfaces mentioned above to reduce correcting effects for various aberrations. When $r_5/r_4$ exceeds the upper limit of the condition (2), on the other hand, refractive power becomes too high to keep proper balance among various aberrations. When the radii of curvature $r_1$ and $r_3$ on the object side surfaces of the first and second lens components have values below the lower limits defined by the conditions (1) and (2) respectively, said surfaces have refractive powers too high to obtain a long back focal distance. When the radii of curvature $r_1$ and $r_3$ exceed the upper limits defined by the conditions (1) and (2) respectively, said surface can not have sufficient correcting powers for various aberrations.

For the rear lens group of the photographic lens system according to the present invention, it is required to select shapes of the image side surface of the fourth lens component and the fifth lens component as defined by the condition (4). If the radius of curvature $r_{10}$ has an absolute value exceeding the upper limit of the condition (4), correcting effect will be too strong for offaxial rays. If the radius of curvature $r_{10}$ has an absolute value below the lower limit of the condition (4), on the other hand, correcting effect will be too weak for offaxial rays. In the condition (4), requirements for $r_{11}/r_9$ and $-r_{11}$ have been adopted for obtaining an appropriate balance among various aberrations by defining shape of the fifth meniscus lens component in conjunction with the requirement for the abovementioned radius of curvature $r_{10}$. When $r_{11}/r_9$ has a value exceeding the upper limit defined by the condition (4), aberrations will be aggravated for offaxial rays. When $r_{11}/r_9$ has a value below the lower limit of the condition (4), on the other hand, aberrations will be aggravated for paraxial rays. Even when $r_{10}$ and $r_{11}/r_9$ are selected within the ranges defined above, $r_{11}$ having an absolute value exceeding $0.6f$ will weaken refractive powers of the fifth lens component and the image side surface of the fourth lens component, thereby reducing correcting effect for offaxial rays.

While most of variant Gauss type photographic lens systems adopt a condition of $r_{11}/r_9 > 1$, the present invention has made it possible to obtain the above-described correcting effect by selecting the conditions of $r_{11}/r_9 < 1$.

The condition (5) has been adopted in conjunction with the condition (2) which defines $r_5/r_4$ within a certain definite range. Even if $r_5/r_4$ is selected for the second and third lens components within the range defined by the condition (2), lateral chromatic aberration will be aggravated when the airspace $d_4$ between these lens components exceeds the upper limit of the condition (5), or chromatic aberration of spherical aberration will be aggravated when the airspace $d_4$ has a value below the lower limit of the condition (5). When the total sum of the thicknesses of the second lens component, third lens component and the airspace between these two lens components ($d_3 + d_4 + d_5$) exceeds the upper limit of the condition (5), it will be disadvantageous to obtain a long back focal distance. When said total sum has a value below the lower limit of the condition (5), it will be hard to correct spherical aberration. Finally, it will be difficult to favorably correct zonal spherical aberration and Petzval's sum even by using additional means when arithmetic mean value of refractive indices of the materials selected for all the positive lens components is smaller than 1.75 in such a large-aperture photographic lens system as is provided by the present invention. The condition (6) has been adopted for eliminating this defect.

DETAILED DESCRIPTION OF THE PREFERRED EMBODIMENTS

Figure 1:
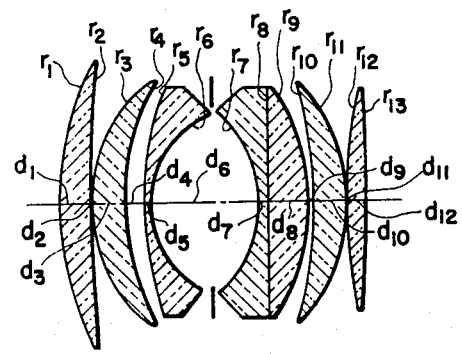
FIG. 1 shows a sectional view illustrating the composition of the photographic lens system according to the present invention.
Figure 2A:
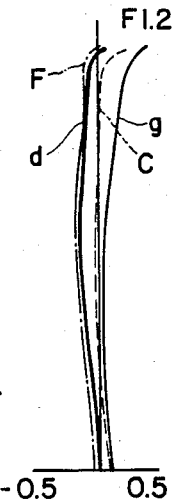
FIGS. 2A through 2D show graphs illustrating the aberration characteristics of Embodiment 1 of the present invention.
Figure 2B:
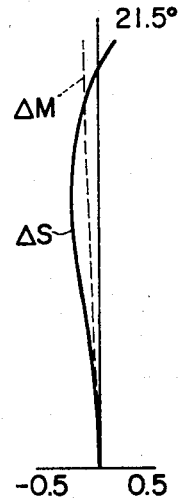
Figure 2C:
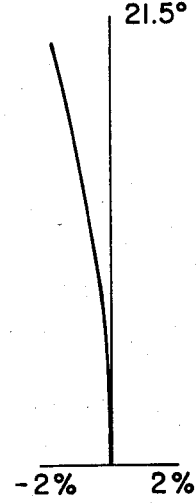
Figure 2D:
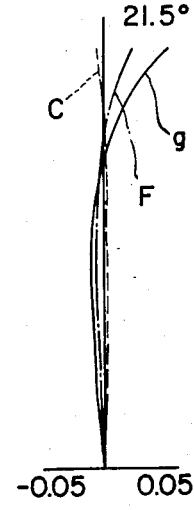
Figure 3A:
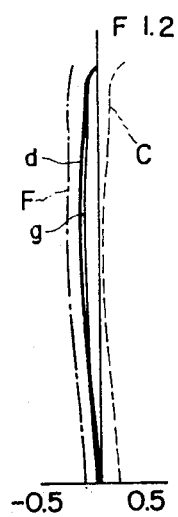
FIGS. 3A through 3D show graphs illustrating the aberration characteristics of Embodiment 2.
Figure 3B:
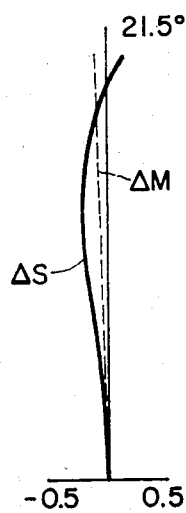
Figure 3C:
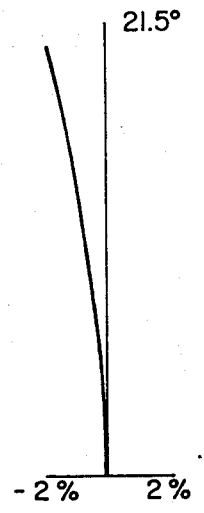
Figure 3D:
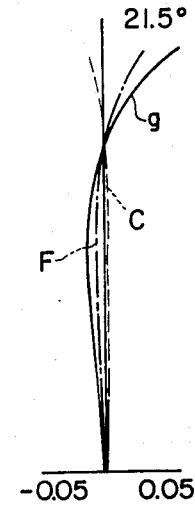
Figure 4A:
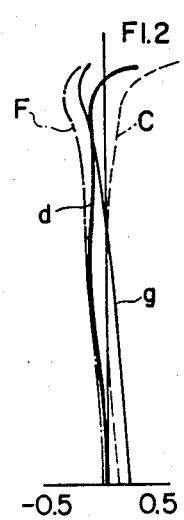
FIGS. 4A through 4D illustrate curves showing the aberration characteristics of Embodiment 3.
Figure 4B:
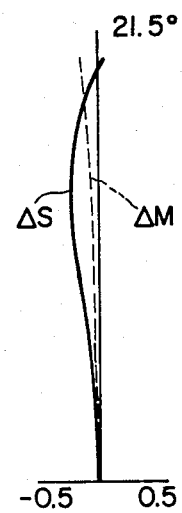
Figure 4C:
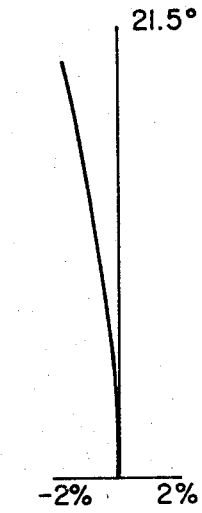
Figure 4D:
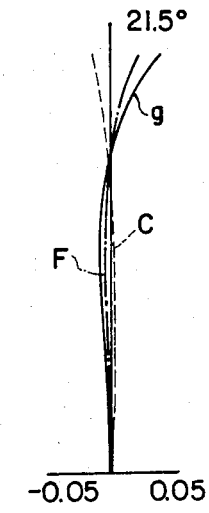
Figure 5A:
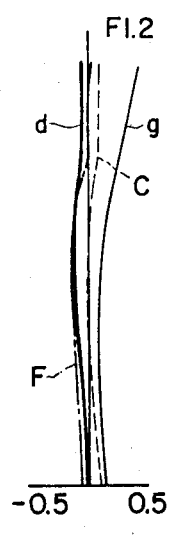
FIGS. 5A through 5D illustrate curves showing the aberration characteristics of Embodiment 4.
Figure 5B:
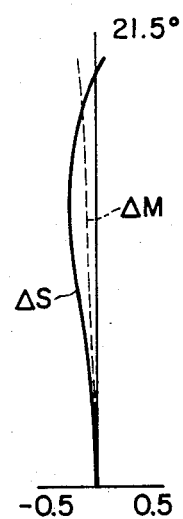
Figure 5C:
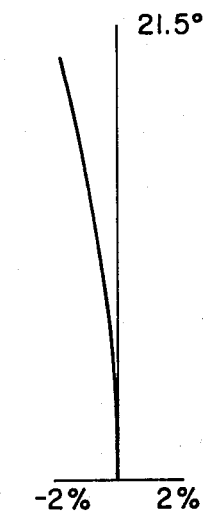
Figure 5D:
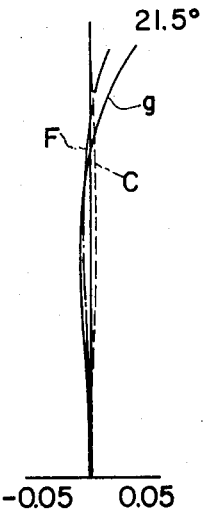
Figure 6A:
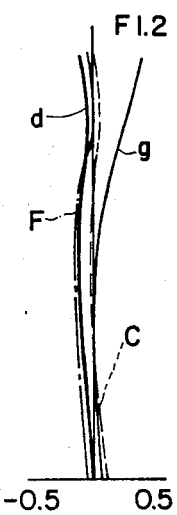
FIGS. 6A through 6D show graphs illustrating the aberration characteristics of Embodiment 5.
Figure 6B:
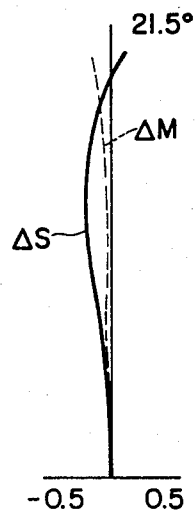
Figure 6C:
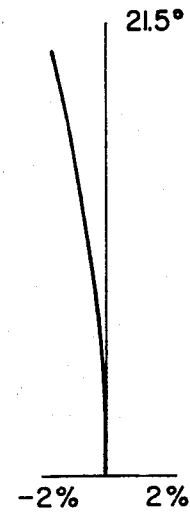
Figure 6D:
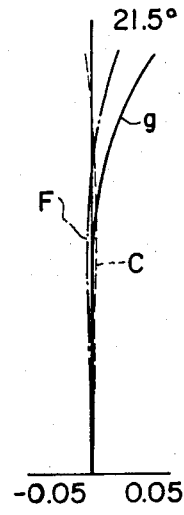

Some preferred embodiments of the present invention will be detailedly described below:

Embodiment 1
$f = 100$, F/1.2, $2\omega = 43°$, $f_B = 69.71$
$r_1 = 89.502$
$d_1 = 10.04$, $n_1 = 1.8061$, $\nu_1 = 40.9$
$r_2 = 402.60$
$d_2 = 0.23$
$r_3 = 46.938$
$d_3 = 10.57$, $n_2 = 1.8061$, $\nu_2 = 40.9$
$r_4 = 78.859$
$d_4 = 4.30$
$r_5 = 95.186$
$d_5 = 2.64$, $n_3 = 1.7847$, $\nu_3 = 26.2$
$r_6 = 30.963$
$d_6 = 33.58$
$r_7 = -34.820$
$d_7 = 2.20$, $n_4 = 1.78472$, $\nu_4 = 25.7$
$r_8 = 892.90$
$d_8 = 12.78$, $n_5 = 1.79952$, $\nu_5 = 42.2$
$r_9 = -59.776$
$d_9 = 0.18$
$r_{10} = -147.16$
$d_{10} = 10.39$, $n_6 = 1.7859$, $\nu_6 = 44.1$
$r_{11} = -55.823$
$d_{11} = 0.23$
$r_{12} = 169.635$
$d_{12} = 6.16$, $n_7 = 1.7859$, $\nu_7 = 44.1$
$r_{13} = -395.38$ Embodiment 2
$f = 100$, F/1.2, $2\omega = 43°$, $f_B = 69.68$
$r_1 = 101.13$
$d_1 = 10.02$, $n_1 = 1.8061$, $\nu_1 = 40.9$
$r_2 = 505.80$
$d_2 = 0.23$
$r_3 = 47.930$
$d_3 = 10.41$, $n_2 = 1.8061$, $\nu_2 = 40.9$
$r_4 = 86.568$
$d_4 = 7.04$
$r_5 = 100.70$
$d_5 = 1.67$, $n_3 = 1.78472$, $\nu_3 = 25.7$
$r_6 = 31.219$
$d_6 = 33.60$
$r_7 = -34.639$
$d_7 = 2.20$, $n_4 = 1.7847$, $\nu_4 = 26.2$
$r_8 = 892.91$
$d_8 = 12.67$, $n_5 = 1.79952$, $\nu_5 = 42.2$
$r_9 = -61.002$
$d_9 = 0.18$
$r_{10} = -171.01$
$d_{10} = 10.35$, $n_6 = 1.7859$, $\nu_6 = 44.1$
$r_{11} = -56.848$
$d_{11} = 0.23$
$r_{12} = 183.26$
$d_{12} = 6.16$, $n_7 = 1.8061$, $\nu_7 = 40.9$
$r_{13} = -318.98$ Embodiment 3
$f = 100$, F/1.2, $2\omega = 43°$, $f_B = 69.74$
$r_1 = 82.395$
$d_1 = 10.04$, $n_1 = 1.8061$, $\nu_1 = 40.9$
$r_2 = 347.58$
$d_2 = 0.23$
$r_3 = 46.400$
$d_3 = 10.57$, $n_2 = 1.79952$, $\nu_2 = 42.2$
$r_4 = 74.008$
$d_4 = 4.29$
$r_5 = 89.902$
$d_5 = 2.64$, $n_3 = 1.78472$, $\nu_3 = 25.7$
$r_6 = 29.829$
$d_6 = 32.04$
$r_7 = -33.705$
$d_7 = 2.20$, $n_4 = 1.76182$, $\nu_4 = 26.6$
$r_8 = -175.86$
$d_8 = 12.77$, $n_5 = 1.757$, $\nu_5 = 47.9$
$r_9 = -56.915$
$d_9 = 0.18$
$r_{10} = -200.42$
$d_{10} = 11.00$, $n_6 = 1.757$, $\nu_6 = 47.9$
$r_{11} = -56.252$
$d_{11} = 0.23$
$r_{12} = 186.23$
$d_{12} = 5.72$, $n_7 = 1.713$, $\nu_7 = 53.9$
$r_{13} = -331.12$ Embodiment 4
$f = 100$, F/1.2, $2\omega = 43°$, $f_B = 69.59$
$r_1 = 86.488$
$d_1 = 10.00$, $n_1 = 1.8061$, $\nu_1 = 40.9$
$r_2 = 398.82$
$d_2 = 0.23$
$r_3 = 47.959$
$d_3 = 10.44$, $n_2 = 1.79952$, $\nu_2 = 42.2$
$r_4 = 77.840$ -continued Embodiment 4

| | | |
|---|---|---|
| $d_4 = 2.11$ | | |
| $r_5 = 100.44$ | | |
| $d_5 = 5.16$ | $n_3 = 1.7552$ | $\nu_3 = 27.5$ |
| $r_6 = 31.300$ | | |
| $d_6 = 33.75$ | | |
| $r_7 = -34.892$ | | |
| $d_7 = 2.20$ | $n_4 = 1.78472$ | $\nu_4 = 25.7$ |
| $r_8 = 769.09$ | | |
| $d_8 = 12.68$ | $n_5 = 1.7432$ | $\nu_5 = 49.4$ |
| $r_9 = -60.406$ | | |
| $d_9 = 0.18$ | | |
| $r_{10} = -160.09$ | | |
| $d_{10} = 10.32$ | $n_6 = 1.8061$ | $\nu_6 = 40.9$ |
| $r_{11} = -55.828$ | | |
| $d_{11} = 0.23$ | | |
| $r_{12} = 185.15$ | | |
| $d_{12} = 6.16$ | $n_7 = 1.7859$ | $\nu_7 = 44.1$ |
| $r_{13} = -313.94$ | | |

Embodiment 5

| $f = 100$, F/1.2, | $2\omega = 43°$, | $f_B = 69.71$ |
|---|---|---|
| $r_1 = 85.544$ | | |
| $d_1 = 10.07$ | $n_1 = 1.8061$ | $\nu_1 = 40.9$ |
| $r_2 = 466.11$ | | |
| $d_2 = 0.23$ | | |
| $r_3 = 50.932$ | | |
| $d_3 = 10.62$ | $n_2 = 1.8061$ | $\nu_2 = 40.9$ |
| $r_4 = 84.051$ | | |
| $d_4 = 2.56$ | | |
| $r_5 = 121.96$ | | |
| $d_5 = 4.97$ | $n_3 = 1.7552$ | $\nu_3 = 27.5$ |
| $r_6 = 32.960$ | | |
| $d_6 = 33.92$ | | |
| $r_7 = -35.428$ | | |
| $d_7 = 2.20$ | $n_4 = 1.78472$ | $\nu_4 = 25.7$ |
| $r_8 = \infty$ | | |
| $d_8 = 12.68$ | $n_5 = 1.734$ | $\nu_5 = 51.5$ |
| $r_9 = -61.485$ | | |
| $d_9 = 0.18$ | | |
| $r_{10} = -139.14$ | | |
| $d_{10} = 10.31$ | $n_6 = 1.79952$ | $\nu_6 = 42.2$ |
| $r_{11} = -55.914$ | | |
| $d_{11} = 0.23$ | | |
| $r_{12} = 168.51$ | | |
| $d_{12} = 6.17$ | $n_7 = 1.7859$ | $\nu_7 = 44.1$ |
| $r_{13} = -265.03$ | | | wherein the reference symbols $r_1$ through $r_{13}$ represent radii of curvature on the surfaces of the respective lenses, the reference symbols $d_1$ through $d_{12}$ designate thicknesses of the respective lenses and airspaces therebetween, the reference symbols $n_1$ through $n_7$ denote refractive indices of the respective lenses and the reference symbols $\nu_1$ through $\nu_7$ represent Abbe's numbers of the respective lenses.

I claim:

1. A large-aperture photographic lens system comprising a first positive meniscus lens component, a second positive meniscus lens component, a third negative meniscus lens component, a fourth cemented doublet lens component, a fifth positive meniscus lens component and a sixth positive lens component having the following numerical data:

| $f = 100$, F/1.2, | $2\omega = 43°$ | $f_B = 69.71$ |
|---|---|---|
| $r_1 = 89.502$ | | |
| $d_1 = 10.04$ | $n_1 = 1.8061$ | $\nu_1 = 40.9$ |
| $r_2 = 402.60$ | | |
| $d_2 = 0.23$ | | |
| $r_3 = 46.938$ | | |
| $d_3 = 10.57$ | $n_2 = 1.8061$ | $\nu_2 = 40.9$ |
| $r_4 = 78.859$ | | |
| $d_4 = 4.30$ | | |
| $r_5 = 95.186$ | | |
| $d_5 = 2.64$ | $n_3 = 1.7847$ | $\nu_3 = 26.2$ |
| $r_6 = 30.963$ | | |
| $d_6 = 33.58$ | | |
| $r_7 = -34.820$ | | |
| $d_7 = 2.20$ | $n_4 = 1.78472$ | $\nu_4 = 25.7$ |

-continued

| | | |
|---|---|---|
| $r_8 = 892.90$ | | |
| $d_8 = 12.78$ | $n_5 = 1.79952$ | $\nu_5 = 42.2$ |
| $r_9 = -59.776$ | | |
| $d_9 = 0.18$ | | |
| $r_{10} = -147.16$ | | |
| $d_{10} = 10.39$ | $n_6 = 1.7859$ | $\nu_6 = 44.1$ |
| $r_{11} = -55.823$ | | |
| $d_{11} = 0.23$ | | |
| $r_{12} = 169.635$ | | |
| $d_{12} = 6.16$ | $n_7 = 1.7859$ | $\nu_7 = 44.1$ |
| $r_{13} = -395.38$ | | | wherein the symbols $r_1$ through $r_{13}$ represent radii of curvature of the surfaces of the respective lenses, $d_1$ through $d_{12}$ designate thicknesses of the respective lenses and airspaces there between, $n_1$ through $n_7$ denote refractive indicies of the respective lenses, $\nu_1$ through $\nu_7$ represent Abbe's numbers of the respective lenses, $f$ is the overall focal length of the lens system, $2w$ is the angular field of view, F is the aperture, and fB is the back focal length.

2. A large-aperture photographic lens system comprising a first positive meniscus lens component, a second positive meniscus lens component, a third negative meniscus lens component, a fourth cemented doublet lens component, a fifth positive meniscus lens component and a sixth positive lens component having the following numerical data:

| $f = 100$, F/1.2, | $2\omega = 43°$, | $f_B = 69.68$ |
|---|---|---|
| $r_1 = 101.13$ | | |
| $d_1 = 10.02$ | $n_1 = 1.8061$ | $\nu_1 = 40.9$ |
| $r_2 = 505.80$ | | |
| $d_2 = 0.23$ | | |
| $r_3 = 47.930$ | | |
| $d_3 = 10.41$ | $n_2 = 1.8061$ | $\nu_2 = 40.9$ |
| $r_4 = 86.568$ | | |
| $d_4 = 7.04$ | | |
| $r_5 = 100.70$ | | |
| $d_5 = 1.67$ | $n_3 = 1.78472$ | $\nu_3 = 25.7$ |
| $r_6 = 31.219$ | | |
| $d_6 = 33.60$ | | |
| $r_7 = -34.639$ | | |
| $d_7 = 2.20$ | $n_4 = 1.7847$ | $\nu_4 = 26.2$ |
| $r_8 = 892.91$ | | |
| $d_8 = 12.67$ | $n_5 = 1.79952$ | $\nu_5 = 42.2$ |
| $r_9 = -61.002$ | | |
| $d_9 = 0.18$ | | |
| $r_{10} = -171.01$ | | |
| $d_{10} = 10.35$ | $n_6 = 1.7859$ | $\nu_6 = 44.1$ |
| $r_{11} = -56.848$ | | |
| $d_{11} = 0.23$ | | |
| $r_{12} = 183.26$ | | |
| $d_{12} = 6.16$ | $n_7 = 1.8061$ | $\nu_7 = 40.9$ |
| $r_{13} = -318.98$ | | | wherein the symbols $r_1$ through $r_{13}$ represent radii of curvature of the surfaces of the respective lenses, $d_1$ through $d_{12}$ designate thicknesses of the respective lenses and airspaces there between, $n_1$ through $n_7$ denote refractive indicies of the respective lenses, $\nu_1$ through $\nu_7$ represent Abbe's numbers of the respective lenses, $f$ is the overall focal length of the lens system, $2w$ is the angular field of view, F is the aperture, and fB is the back focal length.

3. A large-aperture photographic lens system comprising a first positive meniscus lens component, a second positive meniscus lens component, a third negative meniscus lens component, a fourth cemented doublet lens component, a fifth positive meniscus lens component and a sixth positive lens component having the following numerical data:

| $f = 100$, F/1.2, | $2\omega = 43°$, | $f_B = 69.74$ |
|---|---|---|
| $r_1 = 82.395$ | | |

-continued

| | | |
|---|---|---|
| $d_1 = 10.04$ | $n_1 = 1.8061$ | $v_1 = 40.9$ |
| $r_2 = 347.58$ | | |
| $d_2 = 0.23$ | | |
| $r_3 = 46.400$ | | |
| $d_3 = 10.57$ | $n_2 = 1.79952$ | $v_2 = 42.2$ |
| $r_4 = 74.008$ | | |
| $d_4 = 4.29$ | | |
| $r_5 = 89.902$ | | |
| $d_5 = 2.64$ | $n_3 = 1.78472$ | $v_3 = 25.7$ |
| $r_6 = 29.829$ | | |
| $d_6 = 32.04$ | | |
| $r_7 = -33.705$ | | |
| $d_7 = 2.20$ | $n_4 = 1.76182$ | $v_4 = 26.6$ |
| $r_8 = -175.86$ | | |
| $d_8 = 12.77$ | $n_5 = 1.757$ | $v_5 = 47.9$ |
| $r_9 = -56.915$ | | |
| $d_9 = 0.18$ | | |
| $r_{10} = -200.42$ | | |
| $d_{10} = 11.00$ | $n_6 = 1.757$ | $v_6 = 47.9$ |
| $r_{11} = -56.252$ | | |
| $d_{11} = 0.23$ | | |
| $r_{12} = 186.23$ | | |
| $d_{12} = 5.72$ | $n_7 = 1.713$ | $v_7 = 53.9$ |
| $r_{13} = -331.12$ | | | wherein the symbols $r_1$ through $r_{13}$ represent radii of curvature of the surfaces of the respective lenses, $d_1$ through $d_{12}$ designate thicknesses of the respective lenses and airspaces there between, $n_1$ through $n_7$ denote refractive indicies of the respective lenses, $v_1$ through $v_7$ represent Abbe's numbers of the respective lenses, $f$ is the overall focal length of the lens system, $2w$ is the angular field of view, F is the aperture, and fB is the back focal length.

4. A large-aperture photographic lens system comprising a first positive meniscus lens component, a second positive meniscus lens component, a third negative meniscus lens component, a fourth cemented doublet lens component, a fifth positive meniscus lens component and a sixth positive lens component having the following numerical data:

| $f = 100$, F/1.2, | $2\omega = 43°$, | $f_B = 69.59$ |
|---|---|---|
| $r_1 = 86.488$ | | |
| $d_1 = 10.00$ | $n_1 = 1.8061$ | $v_1 = 40.9$ |
| $r_2 = 398.82$ | | |
| $d_2 = 0.23$ | | |
| $r_3 = 47.959$ | | |
| $d_3 = 10.44$ | $n_2 = 1.79952$ | $v_2 = 42.2$ |
| $r_4 = 77.840$ | | |
| $d_4 = 2.11$ | | |
| $r_5 = 100.44$ | | |
| $d_5 = 5.16$ | $n_3 = 1.7552$ | $v_3 = 27.5$ |
| $r_6 = 31.300$ | | |
| $d_6 = 33.75$ | | |
| $r_7 = -34.892$ | | |
| $d_7 = 2.20$ | $n_4 = 1.78472$ | $v_4 = 25.7$ |
| $r_8 = 769.09$ | | |
| $d_8 = 12.68$ | $n_5 = 1.7432$ | $v_5 = 49.4$ |
| $r_9 = -60.406$ | | |
| $d_9 = 0.18$ | | |
| $r_{10} = -160.09$ | | |
| $d_{10} = 10.32$ | $n_6 = 1.8061$ | $v_6 = 40.9$ |
| $r_{11} = -55.828$ | | |
| $d_{11} = 0.23$ | | |
| $r_{12} = 185.15$ | | |
| $d_{12} = 6.16$ | $n_7 = 1.7859$ | $v_7 = 44.1$ |
| $r_{13} = -313.94$ | | | wherein the symbols $r_1$ through $r_{13}$ represent radii of curvature of the surfaces of the respective lenses, $d_1$ through $d_{12}$ designate thicknesses of the respective lenses and airspaces there between, $n_1$ through $n_7$ denote refractive indicies of the respective lenses, $v_1$ through $v_7$ represent Abbe's numbers of the respective lenses, $f$ is the overall focal length of the lens system, $2w$ is the angular field of view, F is the aperture, and fB is the back focal length.

5. A large-aperture photographic lens system comprising a first positive meniscus lens component, a second positive meniscus lens component, a third negative meniscus lens component, a fourth cemented doublet lens component, a fifth positive meniscus lens component and a sixth positive lens component having the following numerical data:

| $f = 100$, F/1.2, | $2\omega = 43°$, | $f_B = 69.71$ |
|---|---|---|
| $r_1 = 85.544$ | | |
| $d_1 = 10.07$ | $n_1 = 1.8061$ | $v_1 = 40.9$ |
| $r_2 = 466.11$ | | |
| $d_2 = 0.23$ | | |
| $r_3 = 50.932$ | | |
| $d_3 = 10.62$ | $n_2 = 1.8061$ | $v_2 = 40.9$ |
| $r_4 = 84.051$ | | |
| $d_4 = 2.56$ | | |
| $r_5 = 121.96$ | | |
| $d_5 = 4.97$ | $n_3 = 1.7552$ | $v_3 = 27.5$ |
| $r_6 = 32.960$ | | |
| $d_6 = 33.92$ | | |
| $r_7 = -35.428$ | | |
| $d_7 = 2.20$ | $n_4 = 1.78472$ | $v_4 = 25.7$ |
| $r_8 = \infty$ | | |
| $d_8 = 12.68$ | $n_5 = 1.734$ | $v_5 = 51.5$ |
| $r_9 = -61.485$ | | |
| $d_9 = 0.18$ | | |
| $r_{10} = -139.14$ | | |
| $d_{10} = 10.31$ | $n_6 = 1.79952$ | $v_6 = 42.2$ |
| $r_{11} = -55.914$ | | |
| $d_{11} = 0.23$ | | |
| $r_{12} = 168.51$ | | |
| $d_{12} = 6.17$ | $n_7 = 1.7859$ | $v_7 = 44.1$ |
| $r_{13} = -265.03$ | | | wherein the symbols $r_1$ through $r_{13}$ represent radii of curvature of the surfaces of the respective lenses, $d_1$ through $d_{12}$ designate thicknesses of the respective lenses and airspaces there between, $n_1$ through $n_7$ denote refractive indicies of the respective lenses, $v_1$ through $v_7$ represent Abbe's numbers of the respective lenses, $f$ is the overall focal length of the lens system, $2w$ is the angular field of view, F is the aperture, and fB is the back focal length.

* * * * *